W. SANDS.
HAT HOLDER.
APPLICATION FILED APR. 22, 1921.

1,402,800.  Patented Jan. 10, 1922.

Inventor
Walter Sands
By A. M. Carlsen
Attorney

UNITED STATES PATENT OFFICE.

WALTER SANDS, OF MINNEAPOLIS, MINNESOTA.

HAT HOLDER.

1,402,800.

Specification of Letters Patent.   Patented Jan. 10, 1922.

Application filed April 22, 1921.   Serial No. 463,499.

*To all whom it may concern:*

Be it known that I, WALTER SANDS, a citizen of the United States, residing at Minneapolis, in the county of Hennepin and State of Minnesota, have invented a new and useful Hat Holder, of which the following is a specification.

My invention relates to hat holders and the objects are: first, to provide a light, efficient and simple device for holding one or more hats; second, to provide a hat holder particularly adapted to be secured to the roof supporting members of automobile tops or any other place where a hat holder is useful.

In the accompanying drawing:—

Figure 6:
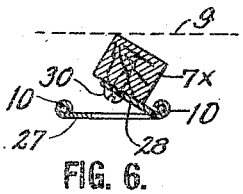
Fig. 6 is a sectional elevation on line 6—6 of Fig. 5 slightly altered to show method of attaching main frame of my device in angular relation to its holding means.

Referring to the drawing by reference numerals, 7 designates a transverse top support bar of an automobile or other vehicle, and is supported at its end by vertical frame bars 8. 7ˣ in Fig. 6 represents a top support bar supporting top 9 of an automobile and arranged in an inclined position as is often the case on the so-called open type of automobiles.

My device, when used on automobiles or other vehicles, is attached to the under side of the above mentioned bars thus affording a desirable and convenient means for putting hats in a place where there is no danger of them getting crushed in any way.

Figure 1:
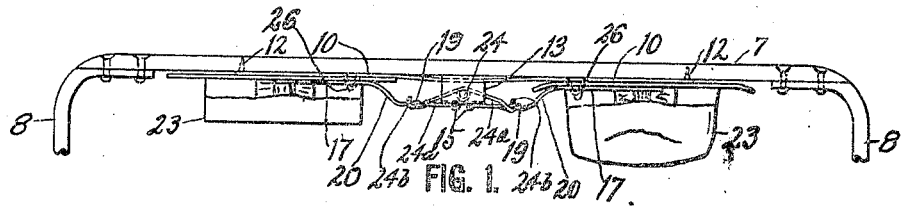
Fig. 1 is a front elevation of a roof supporting member of an automobile or other vehicle, with my hat holding device attached to it.
Figure 2:
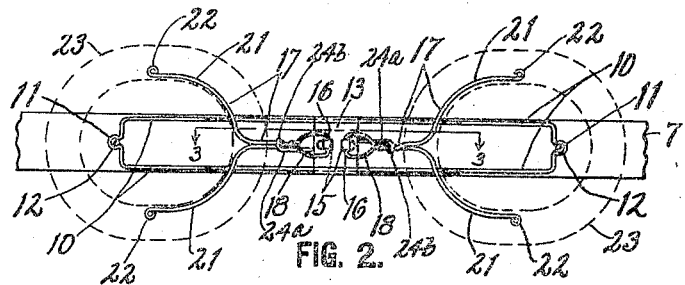
Fig. 2 is a bottom view of Fig. 1.
Figure 3:
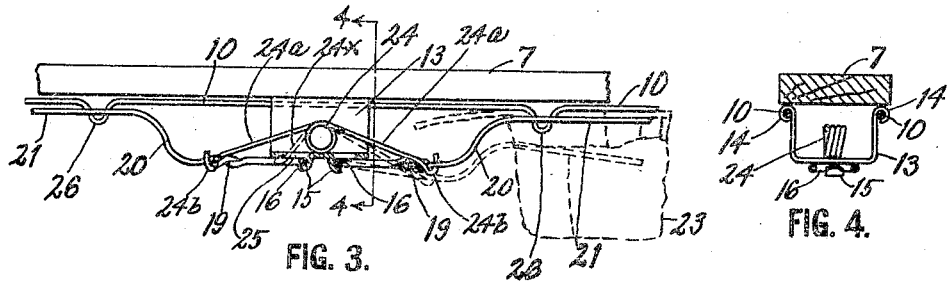
Fig. 3 is an enlarged sectional elevation on line 3—3 of Fig. 2.
Figure 4:
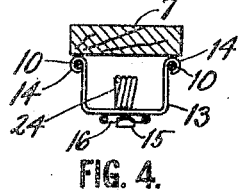
Fig. 4 is a section on line 4—4 of Fig. 3.
Figure 5:
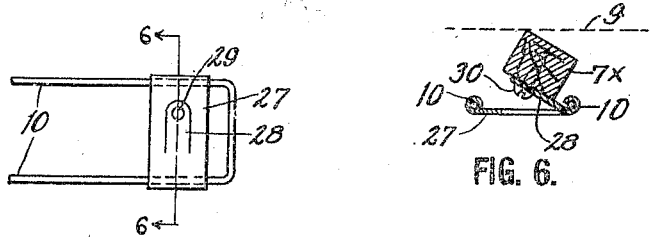
Fig. 5 is an enlarged detail of the main frame end in modified form.

The preferred form of my device consists of a rectangular elongated wire frame or yoke 10 the opposite ends of which are formed with small loops or eyes 11 to receive wood-screws 12 or other fastening means for holding the frame to the bar 7. At the center of said main frame I provide a U-shaped sheet metal yoke 13, the opposite ends of which are beaded around the parallel members of the wire frame 10, as at 14 in Fig. 4. Two oppositely arranged lateral tongues 15 are struck up out of the metal in yoke 13 (as shown in Figs. 1, 2 and 3), and bent to form a bearing for the portion 16 of a Y-shaped hat holding frame 17 which is also preferably of wire and is made of a single piece of wire with the transverse part 16 at its inner end. From thence the wire is bent forward to form a short loop or eye 18 and is then twisted as at 19 for strength, bent upward as at 20 in Figs. 1 and 3, then spread apart and forming a fork of two tines or arms 21 to conform to the general shape of a hat crown. The ends of the tines may terminate in eyelets 22 or be rounded in any suitable manner so as not to injure a hat.

To keep the hat holding members pressed upward against the brim of a hat as 23 I provide a coil spring 24 resting inside of yoke 13 (see Fig. 3) and having its opposite ends extended outward to form arms 24ᵃ each terminating in a hook 24ᵇ engaging the fork at or near the twisted portion of it.

Where a hat holder is made for only one hat only slight alterations in frame 10 are necessary and instead of using both spring arms 24ᵃ as described, one of them as 24ˣ (Fig. 3) may be shortened and passed through the aperture 25 made by punching out tongue 15 and thus making arm 24ˣ a holding means counteracting action of spring arm 24ᵃ.

On some types of automobile tops the bars 7 are arranged in the diagonal or inclined position 7ˣ in Fig. 6, and to secure my device in horizontal relation thereto I provide one or more sheet metal plates 27, the ends of which encircle the opposite parallel bars of frame 10. At the middle of said plate 27 a tongue 28 having an aperture 29 is punched in the metal. Tongue 28 is bendable to conform to any leaning of bar 7ˣ to which it is secured by a screw 30.

The use of the device is as follows:

To place a hat in the holder it is merely necessary to pull down wire yoke or fork 21 approximately to position shown in dotted line in Fig. 3, the hat is then slipped between the tines 21 to position shown and the fork allowed to swing upward and hold the hat.

The wire of the main frame 10 may be bent downward as at 26 to form an obstruction inside of hat crown to prevent the hat from slipping out.

What I claim is:

1. A hat holding device for use in automobiles or like places, the same comprising an elongated skeleton frame having two longitudinal parallel bars, one or more plates secured across said frame and having a partly cut loose bendable perforated tongue and a screw through said tongue for securing it to the wood work of the roof of the vehicle, and means on said frame for holding one or more hats.

2. A hat holding device comprising a frame having means for securing it to the bow of a vehicle top or similar rigid object, a fork shaped arm pivoted to the frame to swing to and from the same, and a spring holding said fork normally against the frame, said fork having two tines or arms adapted to straddle the crown of a hat and hold its brim pinched to the frame said frame having an offset forming an obstruction arranged to engage with the hat and prevent its moving out of the fork.

3. The structure specified in claim 2, said fork being formed of a single piece of wire bent to form a hinge pintle at the middle and then twisted together and spread with its ends to form the tines of the fork, and the frame having a hinge member to receive said pintle, said hinge member being arched away from the frame to form a housing and holder for the spring acting on the fork.

In testimony whereof I affix my signature.

WALTER SANDS.